United States Patent
Hebb et al.

(10) Patent No.: US 6,667,959 B1
(45) Date of Patent: Dec. 23, 2003

(54) SWITCH FABRIC TESTING

(75) Inventors: Andrew T. Hebb, Hudson, MA (US); Thomas Andrew Hoch, Boxborough, MA (US); Patrick L. DeAngelis, Northborough, MA (US); Brian W. Branscomb, Hopkinton, MA (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 09/459,434

(22) Filed: Dec. 13, 1999

(51) Int. Cl.[7] .................................................. H04J 3/14
(52) U.S. Cl. ........................................ 370/241; 370/250
(58) Field of Search ............................. 370/219, 241.1, 370/250, 242, 248, 249, 244, 395.1, 397, 399

(56) References Cited

U.S. PATENT DOCUMENTS

| | | | | |
|---|---|---|---|---|
| 5,500,851 A | * | 3/1996 | Kozaki et al. ............... | 370/250 |
| 5,875,177 A | * | 2/1999 | Uriu et al. ................... | 370/244 |
| 5,974,045 A | * | 10/1999 | Ohkura et al. ............. | 370/241.1 |
| 6,067,286 A | * | 5/2000 | Jones et al. ................. | 370/244 |
| 6,147,972 A | * | 11/2000 | Onishi et al. ............... | 370/248 |
| 6,310,875 B1 | * | 10/2001 | Nichols et al. ............. | 370/388 |
| 6,396,811 B1 | * | 5/2002 | Petersen ...................... | 370/250 |

* cited by examiner

*Primary Examiner*—Chau Nguyen
*Assistant Examiner*—Soon-Dong Hyun

(57) ABSTRACT

A method is presented which allows for the testing and verification of an off-line switch fabric used in network switch having redundant switch fabrics. A special test cell is directed to the off-line switch fabric, loops through a portion of the switching core of the off-line switch fabric, and is returned from the off-line switch fabric. A plurality of test cells can be used to provide full mesh connectivity checking of the off-line switch fabric. Testing is accomplished without need for reconfiguration of the off-line switch fabric, and the off-line switch fabric is available for use immediately upon determination of the need therefor.

18 Claims, 6 Drawing Sheets

| Cell Byte Number | 7 | 6 | 5 | 4 | 3 | 2 | 1 | 0 |
|---|---|---|---|---|---|---|---|---|
| 1 | N/A ||||||||
| 2 | N/A ||||||||
| 3 | QNR |||||| DLP ||
| 4 | Port Bitmap (39:32) ||||||||
| 5 | Port Bitmap (31:24) ||||||||
| 6 | Port Bitmap (23:16) ||||||||
| 7 | Port Bitmap (15:8) ||||||||
| 8 | Port Bitmap (7:0) ||||||||
| 9 | N/A ||||||||
| 10 | N/A ||||||||
| 11 | N/A ||||| SWB | N/A ||
| 12 | N/A ||||||||
| 13 | N/A ||||||||
| 14 | N/A ||||||||
| 15 | Connection Tag (15:8) for CID Check ||||||||
| 16 | Connection Tag (7:0) for CID Check ||||||||
| 17 | QNR for Hopping Address 1 |||||| DLP - 1 ||
| 18 | Port Bitmap (39:32) for Hopping Address 1 ||||||||
| 19 | Port Bitmap (31:24) for Hopping Address 1 ||||||||
| 20 | Port Bitmap (23:16) for Hopping Address 1 ||||||||
| 21 | Port Bitmap (15:8) for Hopping Address 1 ||||||||
| 22 | Port Bitmap (7:0) for Hopping Address 1 ||||||||
| 23 | QNR for Hopping Address 2 |||||| DLP - 2 ||
| 24 | Port Bitmap (39:32) for Hopping Address 2 ||||||||
| 25 | Port Bitmap (31:24) for Hopping Address 2 ||||||||
| 26 | Port Bitmap (23:16) for Hopping Address 2 ||||||||
| 27 | Port Bitmap (15:8) for Hopping Address 2 ||||||||
| 28 | Port Bitmap (7:0) for Hopping Address 2 ||||||||
| 29-68 | N/A ||||||||

*FIG. 3*

| Cell Byte Number | 7 | 6 | 5 | 4 | 3 | 2 | 1 | 0 |
|---|---|---|---|---|---|---|---|---|
| 1 | N/A ||||||||
| 2 | N/A ||||||||
| 3 | QNR for Hopping Address 1 |||||| DLP - 1 ||
| 4 | Port Bitmap (39:32) for Hopping Address 1 ||||||||
| 5 | Port Bitmap (31:24) for Hopping Address 1 ||||||||
| 6 | Port Bitmap (23:16) for Hopping Address 1 ||||||||
| 7 | Port Bitmap (15:8) for Hopping Address 1 ||||||||
| 8 | Port Bitmap (7:0) for Hopping Address 1 ||||||||
| 9 | N/A ||||||||
| 10 | N/A ||||||||
| 11 | N/A |||| SWB || N/A ||
| 12 | N/A ||||||||
| 13 | N/A ||||||||
| 14 | N/A ||||||||
| 15 | Connection Tag (15:8) for CID Check ||||||||
| 16 | Connection Tag (7:0) for CID Check ||||||||
| 17 | QNR for Hopping Address 2 |||||| DLP - 2 ||
| 18 | Port Bitmap (39:32) for Hopping Address 2 ||||||||
| 19 | Port Bitmap (31:24) for Hopping Address 2 ||||||||
| 20 | Port Bitmap (23:16) for Hopping Address 2 ||||||||
| 21 | Port Bitmap (15:8) for Hopping Address 2 ||||||||
| 22 | Port Bitmap (7:0) for Hopping Address 2 ||||||||
| 23 | QNR for Hopping Address 2 |||||| DLP - 2 ||
| 24 | Port Bitmap (39:32) for Hopping Address 2 ||||||||
| 25 | Port Bitmap (31:24) for Hopping Address 2 ||||||||
| 26 | Port Bitmap (23:16) for Hopping Address 2 ||||||||
| 27 | Port Bitmap (15:8) for Hopping Address 2 ||||||||
| 28 | Port Bitmap (7:0) for Hopping Address 2 ||||||||
| 29-68 | N/A ||||||||

*FIG. 4*

| Cell Byte Number | 7 | 6 | 5 | 4 | 3 | 2 | 1 | 0 |
|---|---|---|---|---|---|---|---|---|
| 1 | N/A ||||||||
| 2 | N/A ||||||||
| 3 | QNR for Hopping Address 2 |||||| DLP - 2 ||
| 4 | Port Bitmap (39:32) for Hopping Address 2 ||||||||
| 5 | Port Bitmap (31:24) for Hopping Address 2 ||||||||
| 6 | Port Bitmap (23:16) for Hopping Address 2 ||||||||
| 7 | Port Bitmap (15:8) for Hopping Address 2 ||||||||
| 8 | Port Bitmap (7:0) for Hopping Address 2 ||||||||
| 9 | N/A ||||||||
| 10 | N/A ||||||||
| 11 | N/A ||||| SWB || N/A |
| 12 | N/A ||||||||
| 13 | N/A ||||||||
| 14 | N/A ||||||||
| 15 | Connection Tag (15:8) for CID Check ||||||||
| 16 | Connection Tag (7:0) for CID Check ||||||||
| 17 | QNR for Hopping Address 2 |||||| DLP - 2 ||
| 18 | Port Bitmap (39:32) for Hopping Address 2 ||||||||
| 19 | Port Bitmap (31:24) for Hopping Address 2 ||||||||
| 20 | Port Bitmap (23:16) for Hopping Address 2 ||||||||
| 21 | Port Bitmap (15:8) for Hopping Address 2 ||||||||
| 22 | Port Bitmap (7:0) for Hopping Address 2 ||||||||
| 23 | QNR for Hopping Address 2 |||||| DLP - 2 ||
| 24 | Port Bitmap (39:32) for Hopping Address 2 ||||||||
| 25 | Port Bitmap (31:24) for Hopping Address 2 ||||||||
| 26 | Port Bitmap (23:16) for Hopping Address 2 ||||||||
| 27 | Port Bitmap (15:8) for Hopping Address 2 ||||||||
| 28 | Port Bitmap (7:0) for Hopping Address 2 ||||||||
| 29-68 | N/A ||||||||

*FIG. 5*

SWITCH FABRIC TESTING

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

In order to provide a high level of availability, packet and cell switches often employ redundant switch fabrics to increase their availability. The redundant or off-line switch fabric is not used until it is needed, and thus if the off-line switch fabric is not functional, the unavailability of the off-line switch fabric is not determined until the need for the off-line switch fabric to be utilized. It would be desirable to provide a method for determining that the off-line switch fabric is functional before the need arises for the off-line switch fabric has been established. It would also be desirable to test the functionality of the off-line switch fabric without special test reconfiguration.

BRIEF SUMMARY OF THE INVENTION

A method is presented which allows for the testing and verification of an off-line switch fabric used in a network switch having redundant switch fabrics. A special test cell is directed to the off-line switch fabric, loops through a portion of the switching core of the off-line switch fabric, and is returned from the off-line switch fabric. A plurality of test cells can be used to provide full mesh connectivity checking of the off-line switch fabric. Testing is accomplished without need for reconfiguration of the off-line switch fabric, and the off-line switch fabric is available for use immediately upon determination of the need therefor.

BRIEF DESCRIPTION OF THE SEVERAL VIEWS OF THE DRAWING

The invention will be more fully understood from the following detailed description taken in conjunction with the accompanying drawings in which:

FIG. 3 is a diagram of the format of the test cell;

FIG. 4 is a diagram of the format of the test cell on the first loopback; and

FIG. 5 is a diagram of the format of the test cell on the second loopback.

DETAILED DESCRIPTION OF THE INVENTION

Figure 1:
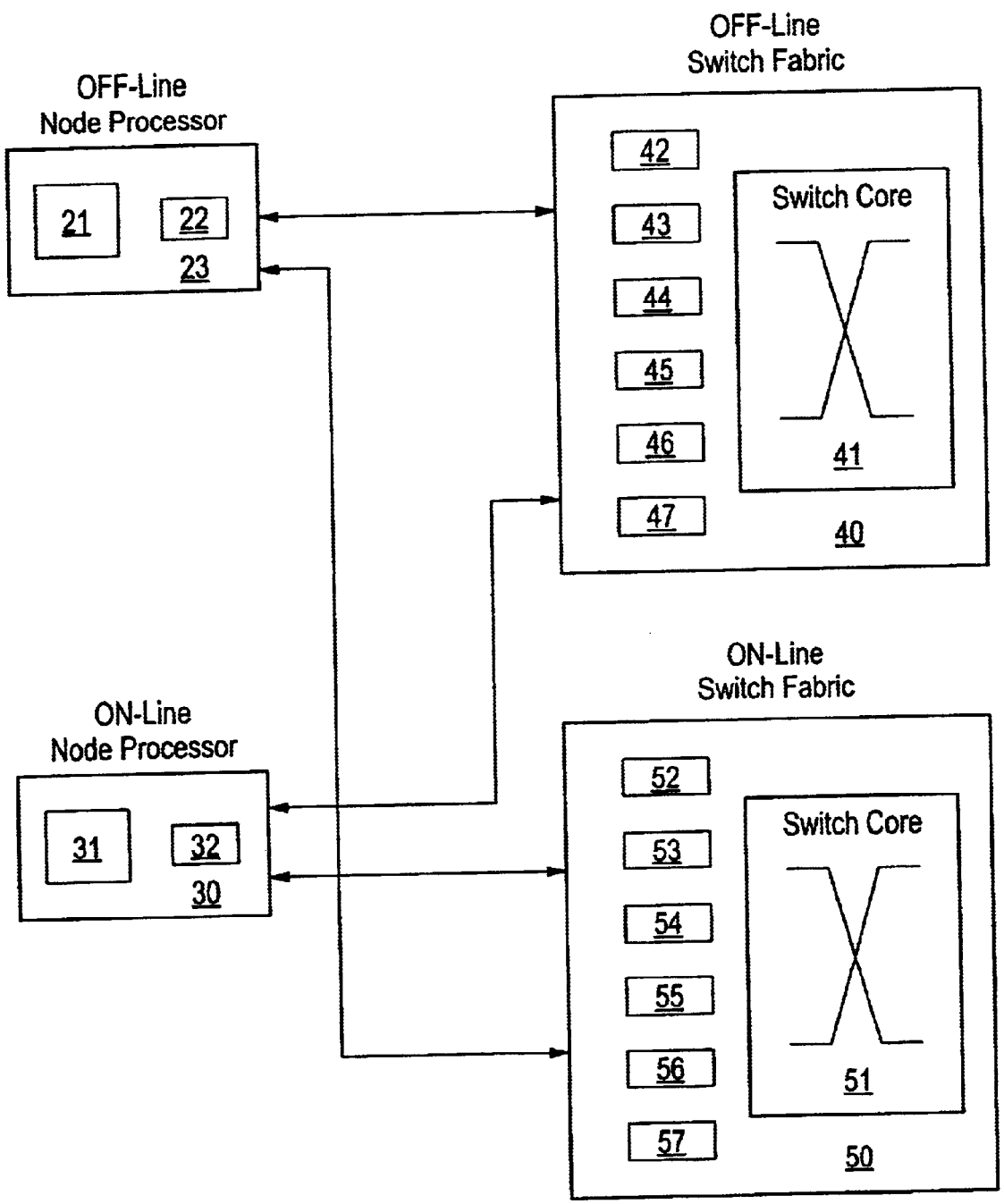
FIG. 1 is a block diagram of a packet switch including redundant switch fabrics.

High reliability packet and cell network switches incorporate redundant switch fabrics in order to increase the availability of the network switch. Referring to FIG. 1, in a high reliability network switch one of the switch fabrics is referred to as the "on-line" switch fabric 50, and a redundant switch fabric is referred to as the "off-line" switch fabric 40. While the off-line switch fabric 40 is not being utilized, it is desirable to ascertain that this off-line switch fabric 40 is functional.

The off-line switch fabric 40 is tested by way of a special test cell. The test cell enables the network switch 10 to perform the required cell switching and loopback operations within the off-line switch fabric 40. The test cell is initiated typically by the on-line node processor 30 and is directed by the on-line node processor 30 to the off-line switch fabric 40. The test cell includes a Connection Identifier (CID) and two "hopping" addresses. Full mesh testing of the off-line switch fabric 40 is accomplished by using multiple test cells having different hopping addresses.

Referring now to FIGS. 1–5, in a particular embodiment the network switch includes an off-line node processing element 23 and an online node processing element 30. Each node processing element 23 and 30 includes a node processor 21 and 31 respectively, and an interface 22 and 32 respectively. The network switch further includes an off-line switch fabric 40 and an on-line switch fabric 50. The off-line switch fabric 40 comprises a plurality of interface chips 42–47 and a switch core 41. The switch core 41 comprises an input stage, a center stage, and an output stage. A total of 40 input threads can be simultaneously switched to any of the 40 output threads within the switch fabric. As a cell arrives into the switching core 41 the cell header is examined by the input stage to determine which threads on the output stage the cell should be directed to. The center stage of the switch core is responsible for arbiting the output stage based on the requests from the input stage.

The test cell includes a regular cell header in the first 16 bytes. This header is examined by the interface to determine if this cell is a test cell or a normal data cell. The next 12 bytes of the test cell contain two hopping addresses, which are used by the off-line switch fabric 40 to hop the cell around the switch fabric. The hopping address comprises a six bit Queue Number R (QNR) which identifies the output thread of the incoming cell. The input stage of the switch core 41 will make the appropriate request to the center stage to have the cell sent out on the appropriate output thread. For example if the QNR field of the test cell was set to 15, the test cell would be switched to output thread 15 and come out of the output stage for thread 15. The hopping address further comprises a two bit Delay Priority (DLP) field. The switch fabric 40 utilizes the DLP field to link the cell to one of four priority queues (not shown) associated with each output queue of the switch fabric. The hopping address also includes a 40 bit port map (BPM). The BPM is used to indicate the destination or destinations of the test cell. If the cell is a unicast cell than only one of the 40 bits is set to a 1. If the cell is a multicast cell, them multiple bits are set, a bit for each destination. By setting the hopping address properly and copying the hopping address into the cell header, the cell can be directed to come out on the specified thread once the cell is sent into the switching core 41.

The header includes a Switch Bit (SWB). The SWB is used by the interface of the switch fabric 40. When a test cell arrives into the switch fabric interface from the switch fabric core 41, the switch bit is extracted. If the bit is a "1", the test cell is sent to interface 22, if the bit is a "0", the cell is sent to interface 32. This determines whether the cell is returned to the off-line node processor 23 or the on-line node processor 30. Since the SWB is preserved while the test cell is looped around the switch fabric 40, the SWB must be properly set when the test cell is composed.

Figure 2A:
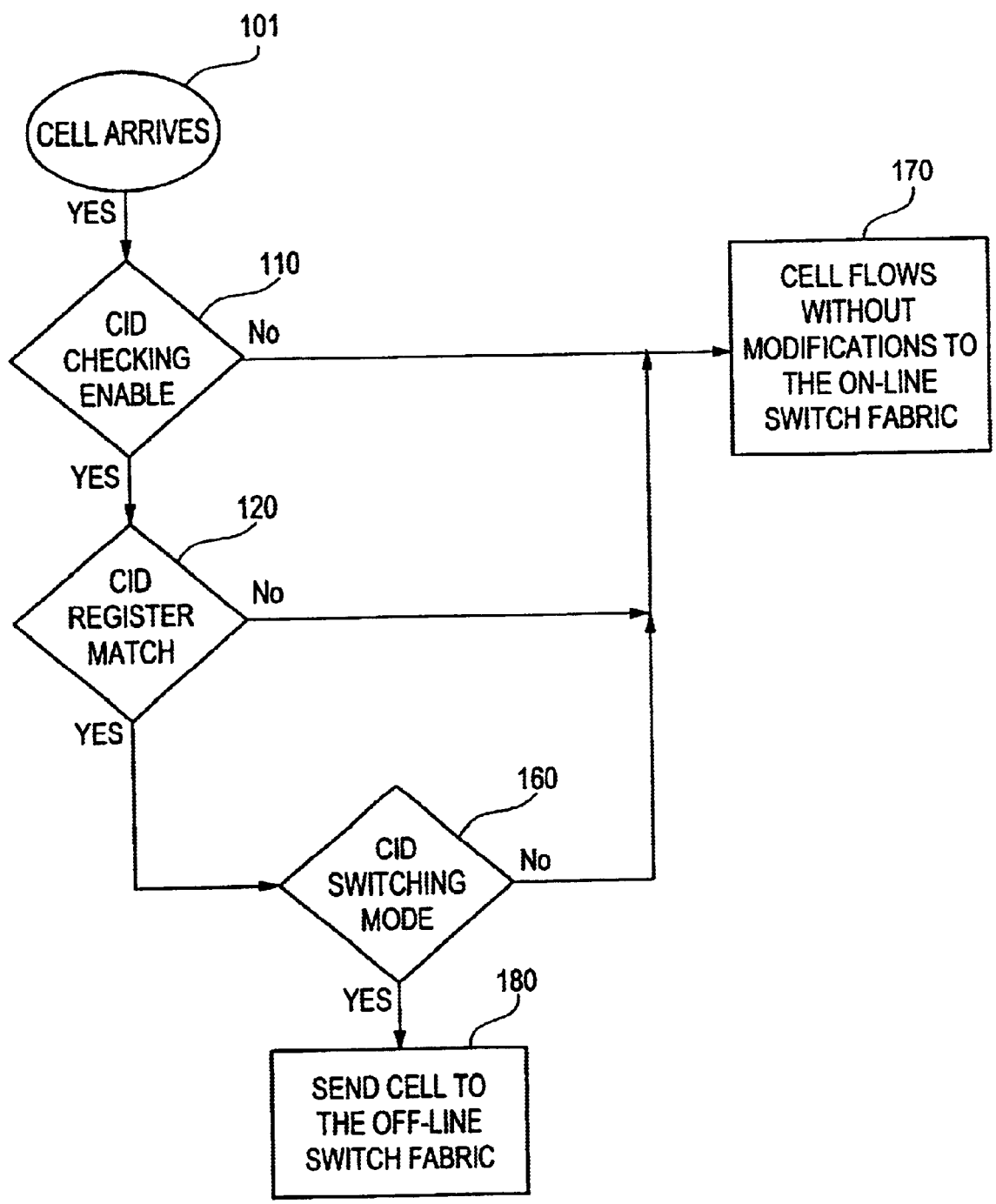
FIGS. 2A and 2B are flow charts illustrating the processing of a test cell.

The connection ID is used by a node processor interface to differentiate the test cells from the normal data cells. Referring to FIG. 2A when a cell from node processor 21 arrives at the node processor interface 22, the 16-bit connection tag in the cell header is extracted and compared against a programmable connection ID register from the processor interface. If there is not a match, the cell is considered a normal data cell and forwarded as usual. If there is a match, then the cell is treated as a test cell and is subjected to further processing. The interface 22 to the node processor 21 and the off-line switch fabric must be enabled in order to perform Connection ID checking. If the enables are not set, then all cells are treated as normal cells.

In operation a test cell is traversed through the off-line switch fabric 40 in the following manner. A test cell is composed by the on-line node processor chip 31 and sent to the node processor interface 32, as shown in step 101. The format of the test cell at this time is shown in FIG. 3. The interface 32 compares the connection ID in the cell header against the connection ID from the processor, as recited at steps 110 and 120. If connection ID checking is not enabled (step 110), if there is not a match (step 120), if loopback is not enabled (step 130) or if the test cell switching mode is not enabled (step 160), interface 32 forwards the cell to interface 52 on the on-line switch fabric 50 (step 170). If there is a match and test cell switching mode is enabled interface 32 forwards the cell to interface 42 on the off-line switch fabric 40 (step 180).

Figure 2B:
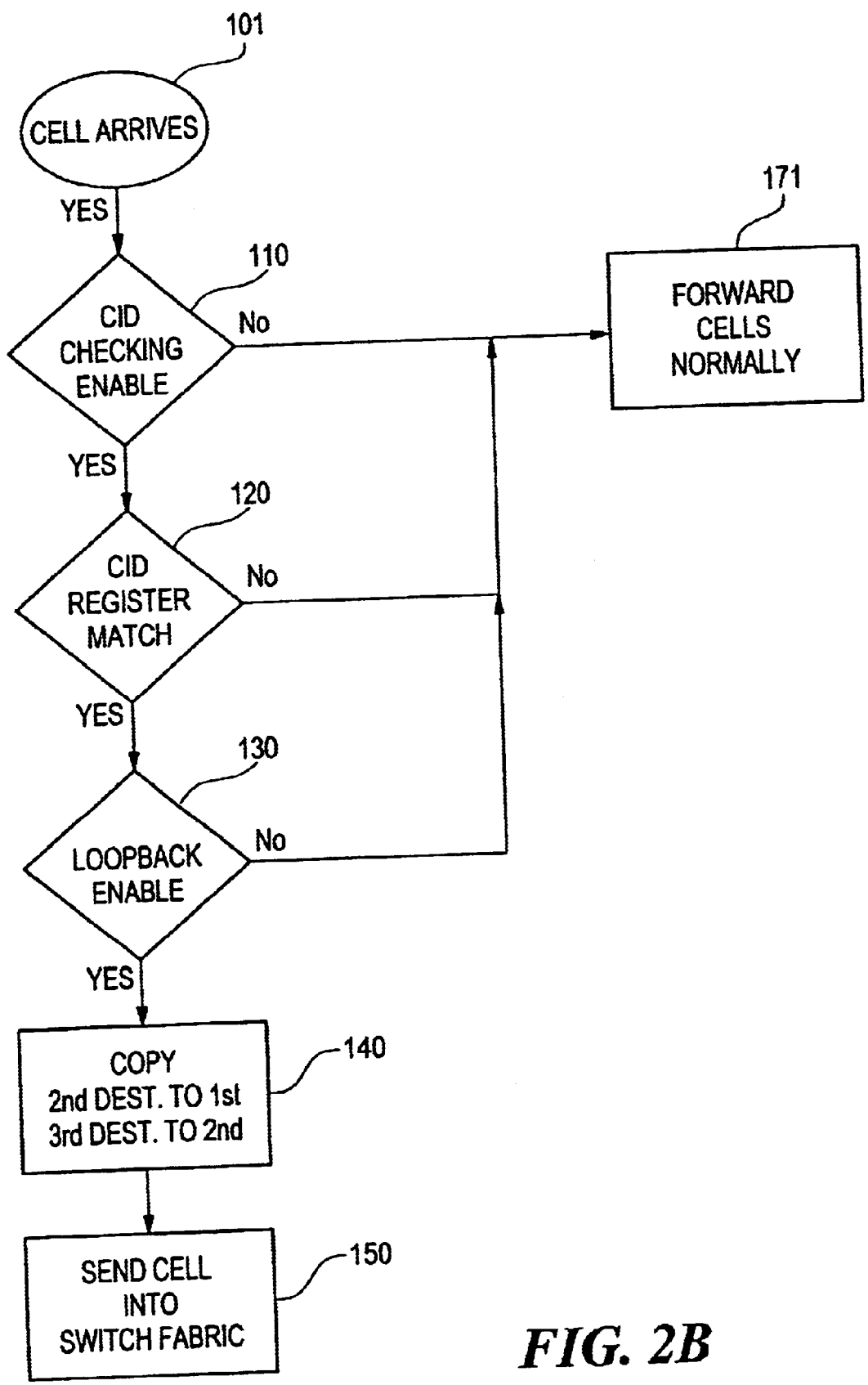

Referring now to FIG. 2B, upon receipt of the test cell by the interface 42, the cell is forwarded into the switch core 41 of the off-line switch fabric 40 without modification. The test cell emerges from the off-line switch fabric core and arrives at one of the interfaces 42–47, dependent on the switching information within the cell header. For this example the test cell arrives at interface 44. It should be noted that a test cell arriving at interface 42 will be sent directly back to a node processor.

Interface 44 compares the connection ID in the cell header against the connection ID from the processor interface, as shown in step 120. If there is a match and the interface is enabled for test cell loop-back operations, as shown in steps 120 and 130, interface 44 will then copy the first hopping address into the cell header, and the second hopping address to the first hopping address location within the test cell as recited at step 140. The format of the cell at this time is shown in FIG. 4. The cell is then sent back into the switch fabric as shown in step 150.

The test cell emerges from the switch fabric core and arrives at one of interfaces 42–47. In this example, the test cell arrives at interface 47.

Interface 47 compares the connection ID in the cell header against the connection ID from the processor interface. If there is a match and if the interface is enabled for loop-back operation, interface 47 will copy the second hopping address (from the original location of the first hopping address) into the cell header. The format of the test cell at this time is shown in FIG. 5. The test cell is then sent into the off-line switch fabric core.

The second hopping address, which is now in the test cell header, is the node processor address. The test cell emerges from the switch fabric core and arrives at interface 42. Interface 42 sends the test cell back to interface 32 of the node processor 30 based on the switch bit. Interface 32 merges the test cell from the off-line switch fabric into the cell stream from the on-line switch fabric. While this embodiment described the process with a test cell generated by the on-line node processor, a similar process would also take place with a test cell generated by the off-line node processor.

The on-line node processor continuously receives cell streams from both the on-line switch fabric and the off-line switch fabric. During testing of the off-line switch fabric the test cells are coming back to the on-line node processor from the off-line switch fabric. The test cells coming back from the off-line switch fabric must be processed to determine the state of the off-line switch fabric. The test cells must be combined or merged into the cell stream with the data cells from the on-line switch fabric. The test cell from the off-line switch fabric is written into the interface input FIFO. The test cell is held in the FIFO until an idle cell slot is detected in the cell stream from the on-line switch fabric. There can only be as many test cells as the FIFO will hold, so that the FIFO holding the test cell(s) will not overrun even though it may have to wait indefinitely for an idle cell(s) slot from the on-line switch fabric.

By way of the above described method, a plurality of test cells may be generated to provide full mesh connectivity testing of the off-line switch fabric.

Having described preferred embodiments of the present invention it should be apparent to those of ordinary skill in the art that other embodiments and variations of the presently disclosed embodiment incorporating these concepts may be implemented without departing from the inventive concepts herein disclosed. Accordingly, the invention should not be viewed as limited to the described embodiments but rather should be limited solely by the scope and spirit of the appended claims.

We claim:

1. A method for testing a switch fabric of a network switch comprising the steps of:

initiating a test cell by providing a first hopping address and a second hopping address;

directing said test cell to said switch fabric by comparing a connection ID field of said test cell with a known connection ID, and by directing said test cell to said switch fabric if said connection ID field matches the known connection ID;

moving said test cell within said switch fabric by copying said first hopping address into a test cell header;

sending said test cell into said switch fabric on a first interface; and receiving said test cell from said switch fabric on a second or third interface.

2. The method of claim 1 wherein said header identifies whether said cell is a test cell or a normal cell.

3. The method of claim 2 wherein said header comprises a Connection ID field.

4. The method of claim 2 wherein said header comprises a Queue Number (QNR) field.

5. The method of claim 2 wherein said header comprises a Delay Priority (DLP) field.

6. The method of claim 2 wherein said header comprises a Port Bitmap field.

7. The method of claim 1 wherein said step of directing further comprises directing said cell in accordance with said plurality of addresses within said test cell.

8. The method of claim 1 wherein the first interface and the second interface are different interfaces.

9. The method of claim 1 wherein the first interface and second interface or third interface are the same interface.

10. The method of claim 1 wherein said step of moving said test cell within said switch fabric further comprises the steps of:

copying said second hopping address into said test cell header;

sending said test cell into said switch fabric; and receiving said test cell from said switch fabric.

11. The method of claim 1 wherein said second interface and said third interface are different interfaces.

12. The method of claim 1 wherein said second interface and said third interface are the same interface.

13. The method of claim 1 wherein only a single test cell is present at a time within said switch fabric.

14. The method of claim 1 wherein multiple test cells are present within the switch fabric.

15. The method of claim 1 wherein the switch fabric includes a switch core, and wherein the test cell is directed and moved within the switch core of the switch fabric.

16. The method of claim 1 wherein the switch fabric is a redundant switch fabric composed of an on-line switch fabric and an off-line switch fabric.

17. The method of claim 6 wherein the test cell is a multicast cell defining a destination port requested by the Port Bitmap field.

18. The method of claim 6 wherein the test cell is a multicast cell defining multiple destination ports represented by the Port Bitmap field.

* * * * *